(12) United States Patent
Wu

(10) Patent No.: US 11,778,982 B1
(45) Date of Patent: Oct. 10, 2023

(54) FEEDING TOY FOR FEEDING PETS THROUGH PET'S AUTONOMOUS PRESSING

(71) Applicant: Kadtc Pet Supplies INC, Los Angeles, CA (US)

(72) Inventor: Changli Wu, Linyi (CN)

(73) Assignee: Kadtc Pet Supplies INC, Los Angeles, CA (US)

( * ) Notice: Subject to any disclaimer, the term of this patent is extended or adjusted under 35 U.S.C. 154(b) by 0 days.

(21) Appl. No.: 18/119,525

(22) Filed: Mar. 9, 2023

(30) Foreign Application Priority Data

Dec. 5, 2022 (CN) .......................... 202223249069.7

(51) Int. Cl.
*A01K 5/02* (2006.01)
*A01K 15/02* (2006.01)
*A01K 5/01* (2006.01)

(52) U.S. Cl.
CPC .......... *A01K 5/0233* (2013.01); *A01K 5/0114* (2013.01); *A01K 15/025* (2013.01)

(58) Field of Classification Search
CPC .. A01K 5/0233; A01K 5/0114; A01K 15/025; A01K 5/01; A01K 5/025; A47G 19/32; B65D 83/04
See application file for complete search history.

(56) References Cited

U.S. PATENT DOCUMENTS

| | | | | |
|---|---|---|---|---|
| 3,558,006 A | * | 1/1971 | Redmond | A47F 1/10 221/274 |
| 4,147,133 A | * | 4/1979 | Molnar | A01K 5/0233 119/55 |
| 4,770,125 A | * | 9/1988 | Gold | A01K 5/0233 222/339 |
| 4,793,290 A | * | 12/1988 | O'Donnell | A01K 5/025 119/55 |
| 5,613,464 A | * | 3/1997 | Petzel | A01K 5/025 119/55 |
| 6,349,671 B1 | | 2/2002 | Lewis | |
| 7,111,581 B2 | * | 9/2006 | Kubala | A01K 5/0114 119/53.5 |
| 7,874,265 B1 | * | 1/2011 | Addleman | A01K 5/025 119/59 |
| 8,448,602 B2 | * | 5/2013 | Lytle | A01K 5/0233 119/55 |
| 10,660,304 B2 | * | 5/2020 | Huang | A01K 5/0114 |
| 11,206,809 B1 | | 12/2021 | Wu | |

(Continued)

*Primary Examiner* — Trinh T Nguyen
(74) *Attorney, Agent, or Firm* — Georgi Korobanov

(57) ABSTRACT

A feeding toy for feeding pets through pet's autonomous pressing, comprising a main body and a food storage bin, wherein a bottom plate is arranged on a bottom of the main body, a feeding trough and a food outlet are arranged on the main body, a sliding channel is arranged on the bottom plate, an upper end of the sliding channel is configured to be a food blocking wall, a food leakage port is arranged on a side of the food storage bin, an adjusting baffle is arranged at an upper end of the food leakage port, a food tray is arranged at a lower end of the food storage bin; when the food storage bin is not pressed down, an outer edge of the food tray is lower than a lower end of the food leakage port, and the food leakage port and the food blocking wall fit together.

10 Claims, 5 Drawing Sheets

(56) References Cited

U.S. PATENT DOCUMENTS

| | | | | |
|---|---|---|---|---|
| 2001/0032594 A1* | 10/2001 | Bickley | .................. | A01K 5/025 |
| | | | | 119/55 |
| 2012/0325157 A1* | 12/2012 | Lipscomb | ............ | A01K 5/0142 |
| | | | | 119/52.1 |
| 2014/0000530 A1* | 1/2014 | Salas | .................... | A01K 15/025 |
| | | | | 119/707 |
| 2016/0120146 A1* | 5/2016 | Parness | ................ | A01K 15/025 |
| | | | | 119/61.4 |
| 2019/0029222 A1* | 1/2019 | Anderton | ............ | A01K 5/0233 |

* cited by examiner

FEEDING TOY FOR FEEDING PETS THROUGH PET'S AUTONOMOUS PRESSING

CROSS-REFERENCE TO RELATED APPLICATIONS

This is a U. S. patent application which claims the priority and benefit of Chinese Patent Application Number 202223249069.7, filed on Dec. 5, 2022, the disclosure of which is incorporated herein by reference in its entirety.

TECHNICAL FIELD

The present application relates to the field of pet supplies, in particular to a feeding toy for feeding pets through pet's autonomous pressing.

BACKGROUND

At present, with the continuous improvement of economic conditions and living conditions, many people keep various pets based on hobbies and other reasons. Pets occupy an important position in people's daily life, and keeping cats and dogs has become a normal life for many people. Surveys show that more and more pet lovers are beginning to buy toys for their pets. Among them, educational toys can help dogs keep their brains active during the exploration process, which in turn can achieve the effect of developing dogs' intelligence. The principle is that the pet gradually obtains food rewards by operating the toy when playing with the toy, so as to achieve the purpose of developing the pet's intelligence and slowing down eating. The process of playing with toys can also play a role in consuming the dog's vigorous energy.

The disadvantage of the existing design is that when the pet is using the toy, due to the dog's nature of being active and addicted to eating, the existing design often has food stuck and no food, which leads to the dog's violent operation and biting to destroy the toy. At the same time, the existing design has a single function and cannot match the foods with different sizes on the market. The speed of food leakage is too fast, and the time for pets to eat is short. Pet owners need to add pet food multiple times. Long-term use causes inconvenience, and it cannot well serve the purpose of slowing down food and consuming the dog's energy.

SUMMARY

The technical problem to be solved by the present application is to provide a feeding toy for feeding pets through pet's autonomous pressing, which can freely adjust the food leakage speed of the toy according to the food size, effectively slow down the pet's eating speed, and solve the problem of food stuck in the toy when the pet is playing, to achieve the purpose of pets obtaining food independently by playing with toys. At the same time, the fun of eating is improved.

The technical solution adopted by the present application to solve the above-mentioned technical problems is: a feeding toy for feeding pets through pet's autonomous pressing, comprising a main body and a food storage bin, a bottom plate is arranged on a bottom of the main body, wherein a feeding trough and a food outlet are arranged on the main body, a sliding channel is arranged on the bottom plate, an upper end of the sliding channel is configured to be a food blocking wall, a food leakage port is arranged on a side of the food storage bin, an upper end of the food leakage port is provided with an adjusting baffle for adjusting a port size of the food leakage port, a lower end of the food storage bin is provided with a food tray that can move up and down; when the food storage bin is not pressed down, an outer edge of the food tray is lower than a lower end of the food leakage port, and the food leakage port on the food storage bin fits closely with the food blocking wall of the main body, and the food in the food storage bin cannot leak out; when the food storage bin is pressed down, the food tray falls with the food storage bin, and after falling to a certain distance, the food tray no longer falls with the food storage bin, but is fixed at a certain height, at this time, the food storage bin continues to fall, and when the lower end of the food leakage port is lower than the outer edge of the food tray, the food storage bin stops falling, and the food leakage port on the food storage bin is connected with the sliding channel on the main body, and the food enters the feeding trough through the food outlet by the sliding channel, and pet can get food from the feeding trough.

The further preferred solution of the present application is: a plurality of the food leakage ports are provided, wherein the number of the sliding channels and the food outlets is the same as the number of the food leakage ports.

The further preferred solution of the present application is: the adjusting baffle for adjusting the port size of the food leakage port is located above the food leakage port and the number of the adjusting baffles is the same as that of the food leakage ports.

The further preferred solution of the present application is: the adjusting baffle is a movable part that can be adjusted up and down, and each adjusting baffle can independently adjust the port size of the food leakage port.

The further preferred solution of the present application is: the food tray is located above the bottom of the food storage bin, and can move up and down through a guiding post.

The further preferred solution of the present application is: a height of an upper surface of the food tray gradually decreases from middle to peripheral side.

The further preferred solution of the present application is: the sliding channel is located between the food outlet and the food leakage port.

The further preferred solution of the present application is: the lifting and returning of the food storage bin realized by springs.

The further preferred solution of the present application is: a movement distance between the food tray and the bottom of the food storage bin is limited by buckles.

The further preferred solution of the present application is: a detachable food cover is arranged above the food storage bin.

In the present application, the pet food is loaded into the food storage bin at one time, and the adjusting baffle in the food storage bin is adjusted up and down according to the food size, and the port size of the food leakage port is controlled to adjust the food leakage speed. When the pet is playing, by pressing the food storage bin, the food in the food storage bin passes through the adjustable-sized leakage port and enters the feeding trough from the sliding channel. When the pet uses the toy to play, the function of automatically supplying food to the pet is realized.

DETAILED DESCRIPTION

The present application will be described in further detail below in conjunction with the accompanying drawings and embodiments.

Figure 1:
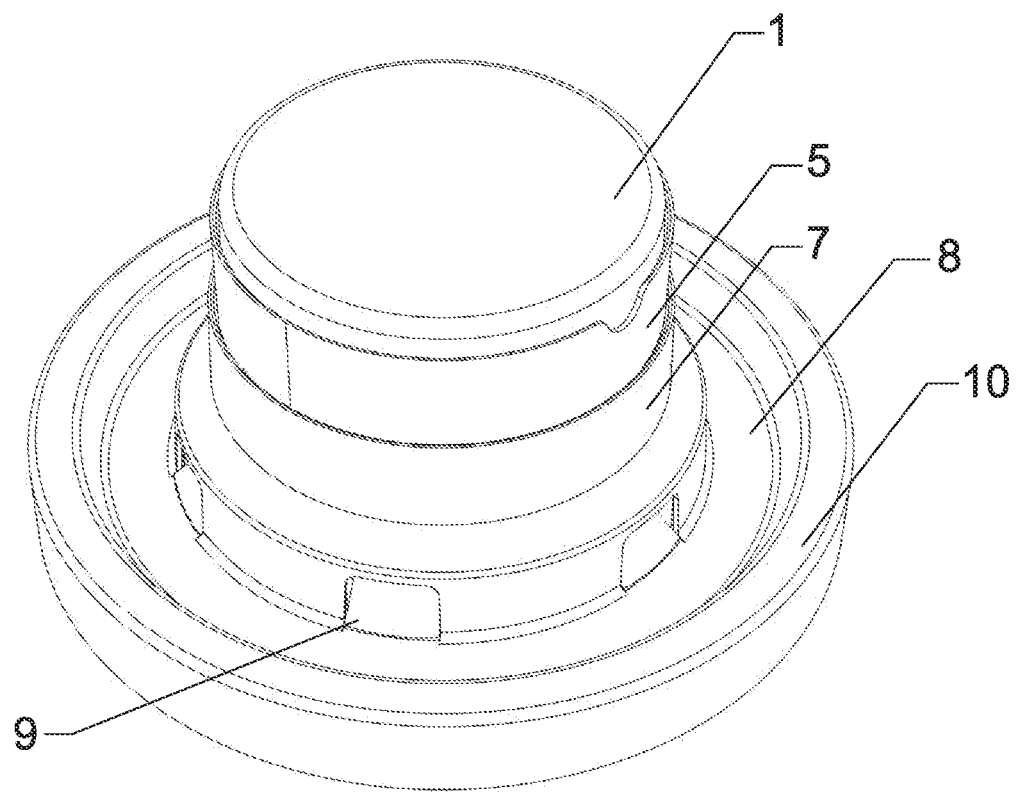
FIG. 1 is the perspective view of the present application.
Figure 2:
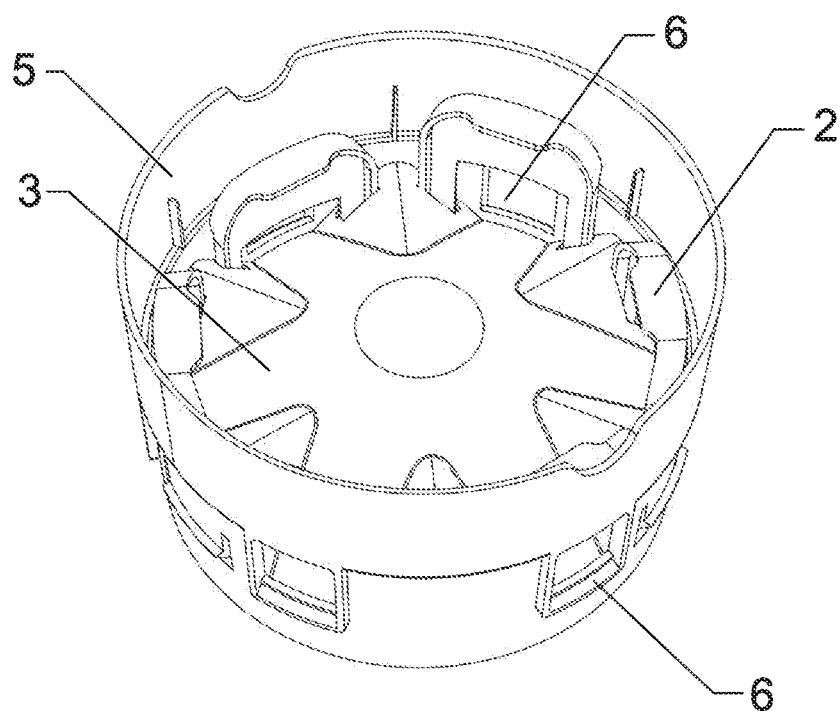
FIG. 2 is the perspective view of the food storage bin of the present application.
Figure 3:
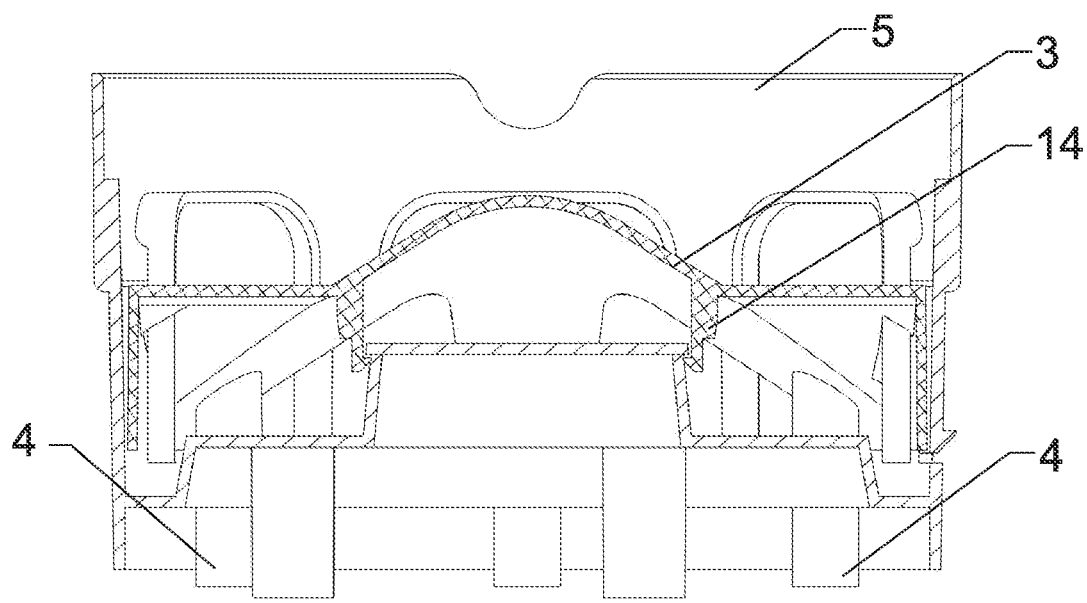
FIG. 3 is a schematic view that the food storage bin of the present application is fixed with the food tray.
Figure 4:
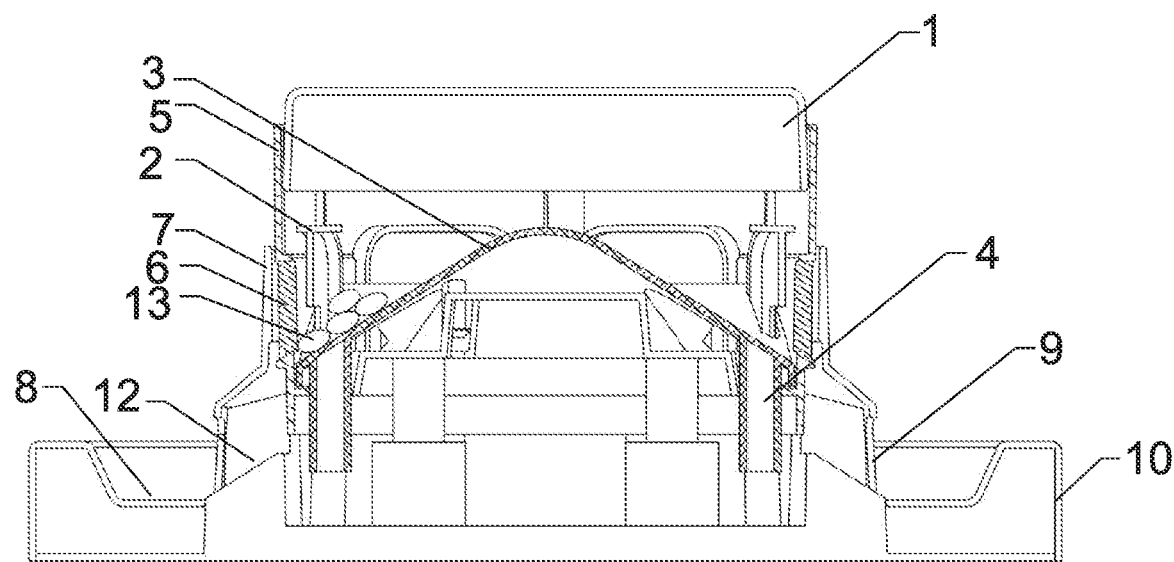
FIG. 4 is a sectional view of the reset state of the food storage bin of the present application.
Figure 5:
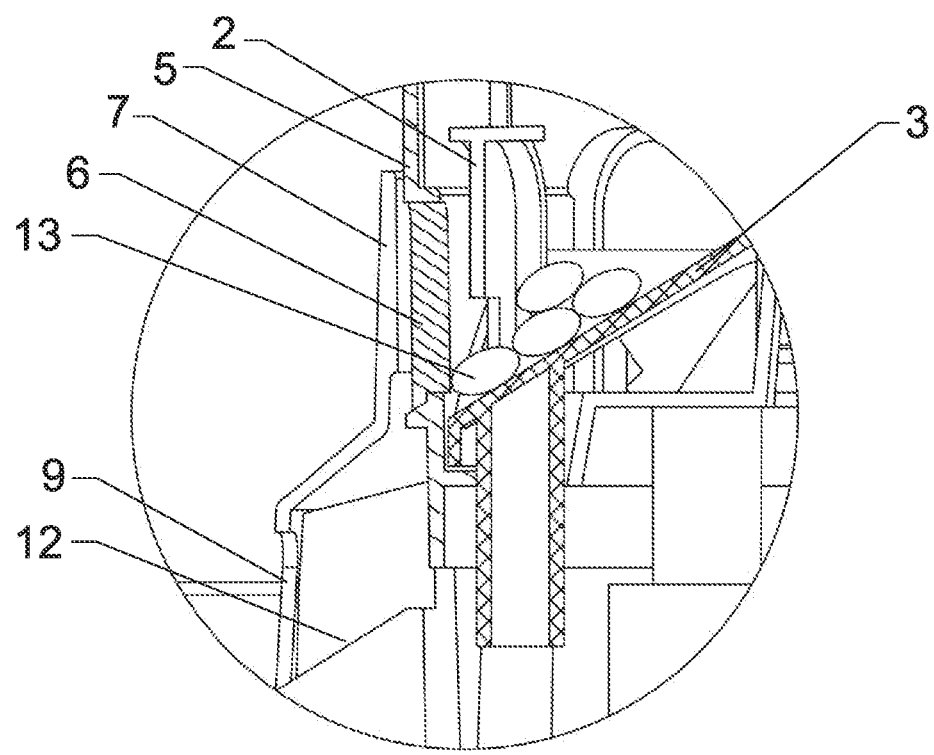
FIG. 5 is an enlarged view of the details of food leakage port when the food storage bin is in reset state in the present application.
Figure 6:
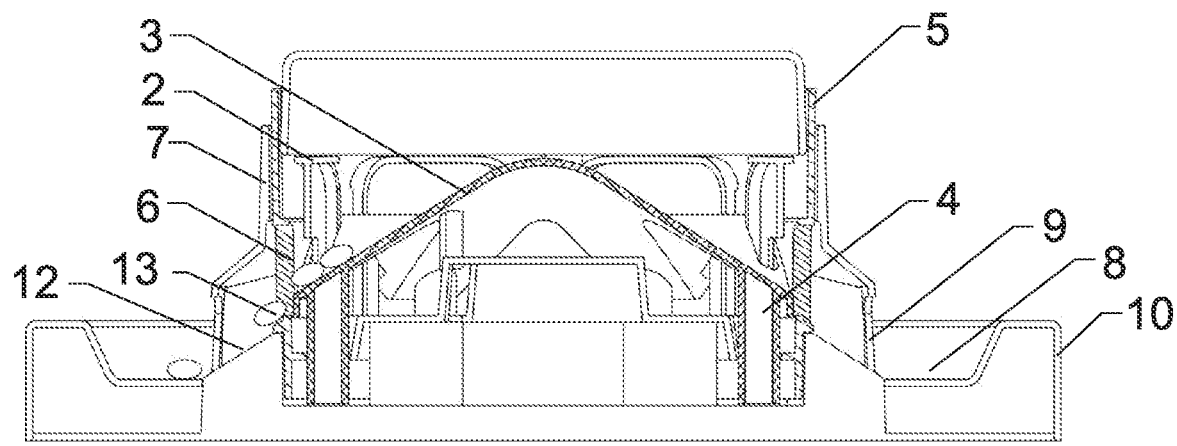
FIG. 6 is a sectional view when the food storage bin of the present application falls to the bottom.
Figure 7:
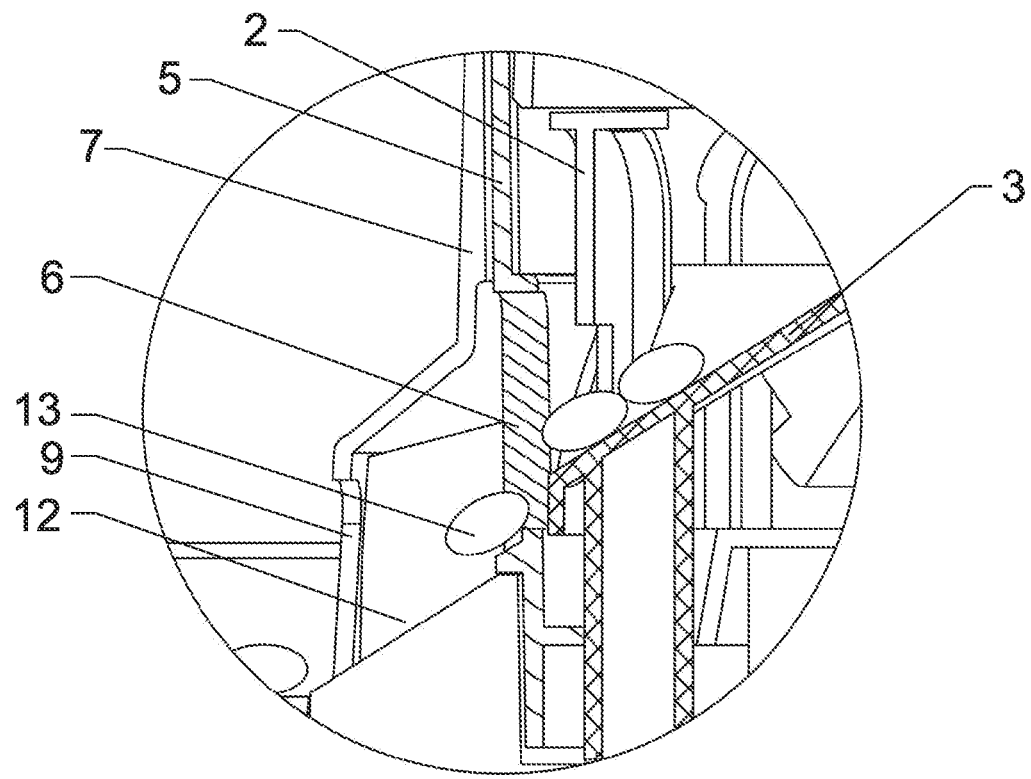
FIG. 7 is an enlarged view of the details of the food leakage port when the food storage bin of the present application is fallen to the bottom.
Figure 8:
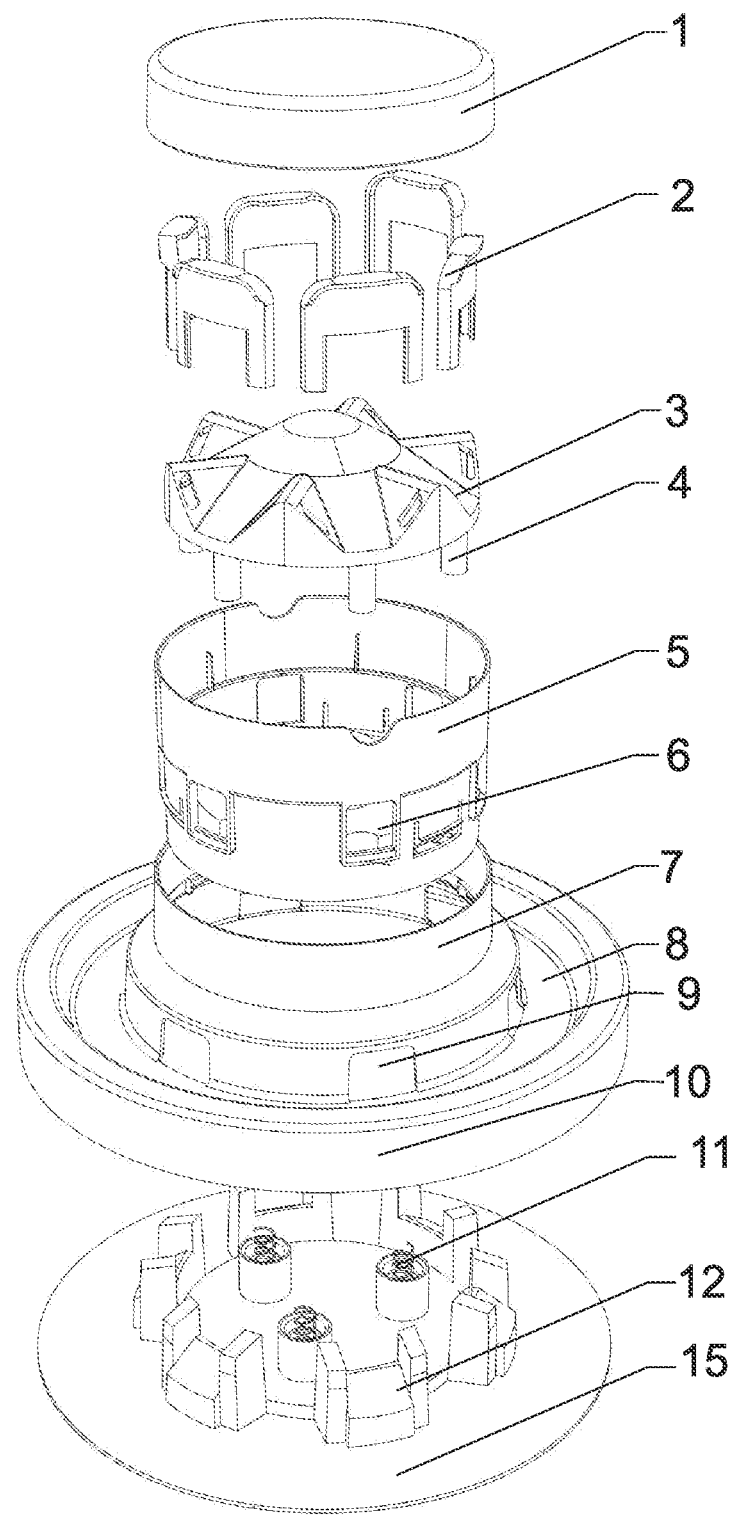
FIG. 8 is the explosion view of the present application.

As shown in FIGS. 1-8, a feeding toy for feeding pets through pet's autonomous pressing comprises a main body 10 and a food storage bin 5, a bottom plate 15 is arranged on a bottom of the main body 10, wherein a feeding trough 8 and a food outlet 9 are arranged on the main body 10, a sliding channel 12 is arranged on the bottom plate 15, an upper end of the sliding channel 12 is configured to be a food blocking wall 7, a food leakage port 6 is arranged on a side of the food storage bin 5, an upper end of the food leakage port 6 is provided with an adjusting baffle 2 for adjusting a port size of the food leakage port 6, a lower end of the food storage bin 5 is provided with a food tray 3 that can move up and down; when the food storage bin 5 is not pressed down, an outer edge of the food tray 3 is lower than a lower end of the food leakage port 6, and the food leakage port 6 on the food storage bin 5 fits closely with the food blocking wall 7 of the main body 10, and the food 13 in the food storage bin 5 cannot leak out; when the food storage bin 5 is pressed down, the food tray 3 falls with the food storage bin 5, and after falling to a certain distance, the food tray 3 no longer falls with the food storage bin 5, but is fixed at a certain height, at this time, the food storage bin 5 continues to fall, and when the lower end of the food leakage port 6 is lower than the outer edge of the food tray 3, the food storage bin 5 stops falling, and the food leakage port 6 on the food storage bin 5 is connected with the sliding channel 12 on the main body 10, and the food 13 enters the feeding trough 8 through the food outlet 9 by the sliding channel 12, and pet can get food 13 from the feeding trough 8. A plurality of the food leakage ports 6 are provided on the food storage bin 5, the number of the sliding channels 12 and the food outlets 9 is the same as the number of the food leakage ports 6. The adjusting baffle 2 for adjusting the port size of the food leakage port 6 is located above the food leakage port 6 and the number of the adjusting baffles 2 is the same as that of the food leakage ports 6. The adjusting baffle 2 is a movable part that can be adjusted up and down, and each adjusting baffle 2 can independently adjust the port size of the food leakage port 6. The food tray 3 is located above the bottom of the food storage bin 5, and can move up and down through a guiding post 4. The height of an upper surface of the food tray 3 gradually decreases from middle to peripheral side. The sliding channel 12 is located between the food outlet 9 and the food leakage port 6. The lifting and returning of the food storage bin 5 realized by springs 11. The food storage bin 5 rises under the effect of spring force, and when the lower end of the food leakage port 6 on the food storage bin 5 is higher than the outer edge of the food tray 3, the lower end of the food leakage port 6 on the food storage bin 5 begins to cut off the connection of the food leakage port 6 with the sliding channel 12, and the food storage bin 5 continues to rise to stop the sliding of the food 13, and the food tray 3 rises and resets with the food storage bin 5 synchronously. A movement distance between the food tray 3 and the bottom of the food storage bin 5 is limited by buckles 14. A detachable food cover 1 is arranged above the food storage bin 5. When the food cover 1 is opened and food 13 could be loaded into the food storage bin 5.

The above is a detailed introduction of a feeding toy for feeding pets through pet's autonomous pressing provided by the present application. In the present application, specific examples are used to illustrate the principle and implementation of the application. The above descriptions of the embodiments are only used to help understand the present application and its core ideas. It should be noticed that those skilled in the art can make some improvements and modifications to the application without departing from the principles of the application, and these improvements and modifications also fall within the protection scope of the claims of the application.

What is claimed is:

1. A feeding toy for feeding pets through pet's autonomous pressing, comprising a main body and a food storage bin, a bottom plate is arranged on a bottom of the main body, wherein a feeding trough and a food outlet are arranged on the main body, a sliding channel is arranged on the bottom plate, an upper end of the sliding channel is configured to be a food blocking wall, a food leakage port is arranged on a side of the food storage bin, an upper end of the food leakage port is provided with an adjusting baffle for adjusting a port size of the food leakage port, a lower end of the food storage bin is provided with a food tray that can move up and down; when the food storage bin is not pressed down, an outer edge of the food tray is lower than a lower end of the food leakage port, and the food leakage port on the food storage bin fits closely with the food blocking wall of the main body, and the food in the food storage bin cannot leak out; when the food storage bin is pressed down, the food tray falls with the food storage bin, and after falling to a certain distance, the food tray no longer falls with the food storage bin, but is fixed at a certain height, at this time, the food storage bin continues to fall, and when the lower end of the food leakage port is lower than the outer edge of the food tray, the food storage bin stops falling, and the food leakage port on the food storage bin is connected with the sliding channel on the main body, and the food enters the feeding trough through the food outlet by the sliding channel, and pet can get food from the feeding trough.

2. The feeding toy for feeding pets through pet's autonomous pressing according to claim 1, wherein a plurality of the food leakage ports are provided, wherein the number of the sliding channels and the food outlets is the same as the number of the food leakage ports.

3. The feeding toy for feeding pets through pet's autonomous pressing according to claim 1, wherein the adjusting baffle for adjusting the port size of the food leakage port is located above the food leakage port and the number of the adjusting baffles is the same as that of the food leakage ports.

4. The feeding toy for feeding pets through pet's autonomous pressing according to claim 3, wherein the adjusting baffle is a movable part that can be adjusted up and down, and each adjusting baffle can independently adjust the port size of the food leakage port.

5. The feeding toy for feeding pets through pet's autonomous pressing according to claim 1, wherein the food tray is located above the bottom of the food storage bin, and can move up and down through a guiding post.

6. The feeding toy for feeding pets through pet's autonomous pressing according to claim 1, wherein a height of an upper surface of the food tray gradually decreases from middle to peripheral side.

7. The feeding toy for feeding pets through pet's autonomous pressing according to claim 1, wherein the sliding channel is located between the food outlet and the food leakage port.

8. The feeding toy for feeding pets through pet's autonomous pressing according to claim 1, wherein the lifting and returning of the food storage bin realized by springs.

9. The feeding toy for feeding pets through pet's autonomous pressing according to claim 1, wherein a movement distance between the food tray and the bottom of the food storage bin is limited by buckles.

10. The feeding toy for feeding pets through pet's autonomous pressing according to claim 1, wherein a detachable food cover is arranged above the food storage bin.

\* \* \* \* \*